United States Patent
Paraschivescu

(10) Patent No.: US 10,210,152 B2
(45) Date of Patent: Feb. 19, 2019

(54) BLOCK DATA WORKSHEETS

(71) Applicant: Quick Eye Technologies Inc., Chicago, IL (US)

(72) Inventor: Andrei Paraschivescu, Chicago, IL (US)

(73) Assignee: Quick Eye Technologies Inc., Chicago, IL (US)

( * ) Notice: Subject to any disclaimer, the term of this patent is extended or adjusted under 35 U.S.C. 154(b) by 431 days.

(21) Appl. No.: 14/769,054

(22) PCT Filed: Feb. 20, 2014

(86) PCT No.: PCT/US2014/017468
§ 371 (c)(1),
(2) Date: Aug. 19, 2015

(87) PCT Pub. No.: WO2014/130715
PCT Pub. Date: Aug. 28, 2014

(65) Prior Publication Data
US 2016/0004683 A1    Jan. 7, 2016

Related U.S. Application Data

(60) Provisional application No. 61/767,167, filed on Feb. 20, 2013.

(51) Int. Cl.
| | | |
|---|---|---|
| G06F 17/30 | (2006.01) |
| G06F 17/24 | (2006.01) |
| G06F 3/0483 | (2013.01) |
| G06F 3/0484 | (2013.01) |
| G06F 17/21 | (2006.01) |

(52) U.S. Cl.
CPC .......... *G06F 17/246* (2013.01); *G06F 3/0483* (2013.01); *G06F 3/04842* (2013.01); *G06F 17/212* (2013.01); *G06F 17/243* (2013.01)

(58) Field of Classification Search
CPC .... G06F 17/246; G06F 17/212; G06F 17/243; G06F 3/0483; G06F 3/04842
USPC ........................................................ 715/212
See application file for complete search history.

(56) References Cited

U.S. PATENT DOCUMENTS

| | | | | |
|---|---|---|---|---|
| 2002/0091728 A1* | 7/2002 | Kjaer | ................... | G06F 17/246 715/212 |
| 2006/0074934 A1* | 4/2006 | Dettinger | .......... | G06F 17/30395 |
| 2006/0271841 A1* | 11/2006 | Thanu | .................. | G06F 17/246 715/202 |
| 2008/0028288 A1* | 1/2008 | Vayssiere | .............. | G06F 17/246 715/219 |

(Continued)

OTHER PUBLICATIONS

Young, Lee W., Authorized Officer, ISA/US, International Search Report and Written Opinion, International Application No. PCT/US2014/017468, dated Jul. 28, 2014, 9 pages.

*Primary Examiner* — Thanh-Ha Dang
(74) *Attorney, Agent, or Firm* — Perkins Coie LLP

(57) ABSTRACT

A display structure that includes data items mapped based on relationships among the data items is visually presented on a user interface. The displayed data includes blocks of data received over a block data interface. The display structure may include a first portion indicative of availability of multiple 2-dimensional views of the data items and a second portion for the user to select one of the multiple 2-dimensional views to become an active view that is viewable by the user.

12 Claims, 15 Drawing Sheets

(56) References Cited

U.S. PATENT DOCUMENTS

2009/0006939 A1    1/2009  Despain et al.
2012/0137203 A1    5/2012  Schodl
2012/0284646 A1*  11/2012  Sitrick ................... G06Q 10/10
                                                              715/753

* cited by examiner

| a | b | c | d | e | f | g | h | i | j |

Formula = <None> Unlink

| Values | -3 | -2 | -1 | 0 | 1 | 2 | 3 | 4 |
|---|---|---|---|---|---|---|---|---|
| -3 | | | | | | | | |
| -2 | | | 01/19/2013 | | | | | |
| -1 | | | | | | | | |
| 0 | | Andrew | 09/06/2002 | otitis | measles | flu | cold | |
| 1 | | Marianne | 11/11/2004 | flu | otitis | measles | | |
| 2 | | George | 06/20/2006 | otitis | measles | | | |
| 3 | | Rebecca | 02/15/2008 | cold | | | | |
| 4 | | | | | | | | |

(A)  a[fact(c[X].n[Y+1]),2*Z]-100+b[X+Y+Z].w
(ABC-Py) a[fact(c[X].n[Y+1]),2*Z]-100+b[X+Y+Z]().w
    (B)  a[#fact($c[#X#].n[#Y+1#]$)#,#2*Z#]-#100+$b[#X+Y+Z#]$.w#
    (C)  a[Code('fact(')+c[Code('X')].n[Code('Y+1')]+Code(')'),Code('2*Z')]-_
         Code('100+')+b[Code('X+Y+Z')]+Code('.w')
    (D)  SET(
             GET(
                 555,
                 "n",
                 LIN(1001,0,1,
                     fact(GET(
                              GET(
                                  555,
                                  "n",
                                  LIN(1003,0,1,X)
                                  ),
                              "n",
                              IDT(Y+1)
                              )
                          ),
                     2*Z
                     )
                 ),
             "n",
             100+GET(
                 GET(
                     555,
                     "n",
                     LIN(1002,0,1,X+Y+Z)
                     ),
                 "n",
                 LIN(1002,1,2,X+Y+Z)
                 ).w,
             LIN(1001,1,2,
                 fact(
                     GET(
                         GET(
                             555,
                             "n",
                             LIN(1003,0,1,X)
                             ),
                         "n",
                         IDT(Y+1)
                         )
                     ),
                 2*Z
                 )
             )
```

FIG. 6

```
class Code: #Wraps native code.
    def __init__(self,code):
        self.code=code
    def __add__(self,other): # + operator
        self.code=self.code+str(other)
        return self
    def __radd__(self,other): #Right + operator
        self.code=str(other)+self.code
        return self
    def __str__(self):
        return self.code def adjust(coord): #Adjusts 1-dimensional indices which are not tuples.
    if isinstance(coord,tuple):
        return list(coord)
    elif not isinstance(coord,list):
        return [coord,]

def printCoord(coord):
    result=''
    for idx in coord:
        result+= ','+str(idx)
    return result class Incomplete(object):
    generated=None
    def __init__(self,target,path):
        self.target=target #Target ID.
        self.path=list(path) #List of (label,step).Step is code,not integer tuple.
    def map(self,coord):
        raise Exception('Pure virtual base.')
    def __getitem__(self,coord): #Called for operator [].
        coord=adjust(coord)
        return Reference(self.target,self.path+self.map(coord))
    def __setitem__(self,coord,y):
        coord=adjust(coord)
        map=self.map(coord)
        mo=Reference(self.target,self.path+map[:-1])
        label,lastCoord=map[-1]
        Incomplete.generated='SET(%s,"%s",%s,%s)'%(str(mo),label,str(y),lastCoord)

class Partial(Incomplete): #Object needs indices applied, e.g c[X].n
    def __init__(self,target,path,label):
        Incomplete.__init__(self,target,path)
        self.label=label
    def map(self,coord):
        return [(self.label,'IDT(%s)' % printCoord(coord)[1:])]
```

FIG. 7A

```
class Mapping(Incomplete): #E.g. a, b or c.
    def __init__(self,id,target,sample):
        Incomplete.__init__(self,target,[])
        self.id=id
        self.sample=sample
    def map(self,coord):
        count=0
        path=[]
        for label,sampleStep in self.sample:
            step=[]
            start=count
            count+=len(sampleStep)
            step='LIN(%d,%d,%d%s)' % (self.id,start,count,printCoord(coord))
            path.append((label,step))
        return path class Reference(object): #Complete object. E.g. b[X,Y,Z].
    def __init__(self,target,path):
        self.target=target
        self.path=path
    def __getattr__(self,attr):
        return Partial(self.target,self.path,attr)
    def gen(self,at):
        if at>0:
            at=at-1
            pred=self.gen(at)
            label,coord=self.path[at]
            return 'GET(%s,"%s",%s)' % (pred,label,coord)
        else:
            return str(self.target)
    def __str__(self:
        return self.gen(len(self.path))
```

FIG. 7B

```
from compiler import * a=Mapping(id=1001,target=555,sample=[('m',(0,)),('n',(0,))])
b=Mapping(id=1002,target=555,sample=[('m',(3,)),('n',(6,))])
c=Mapping(id=1003,target=555,sample=[('m',(1,))])

formula='a[#fact($c[#X#].n[#Y+1#]$)#,#2*Z#]=#100+$b[#X+Y+Z#]$.w#' def translate(s): #Translates from BDW syntax to Python.
    state=0
    out=''
    for c in s:
        if c in set(['$','#']): #The state is changing.
            if state==0: #Spreadsheet mode
                if c=='$':
                    token='+'
                else:
                    token=''
                token+="Code('"
            else: #Code mode
                token="')"
                if c=='$':
                    token+='+'
            out+=token
            state=1-state
        else: #Same state
            out+=c
    if state==1: #Unfinished code mode
        out+="')"
    return out code=translate(formula)
print code
exec code
print Incomplete.generated
```

FIG. 8

BLOCK DATA WORKSHEETS

CROSS REFERENCE TO RELATED APPLICATION

This patent document is a 35 U.S.C. § 371 National Stage application of PCT Application No. PCT/US2014/017468 entitled "BLOCK DATA WORKSHEETS," filed on Feb. 20, 2014, which further claims the benefit of priority of U.S. Provisional Patent Application No. 61/767,167 entitled "BLOCK DATA WORKSHEETS," filed on Feb. 20, 2013. The entire content of the aforementioned patent application is incorporated by reference herein.

BACKGROUND

This patent document relates to organization of data and presentation of data to a user interface.

The amount of data that can be processed and stored by one or more computers has grown multi-fold over the last few years. The explosive growth in the data managed and processed by computers can be witnessed in application areas such as web servers, e-commerce servers, financial databases, multimedia content servers, and so on.

SUMMARY

The present document describes, in some aspects, techniques for organizing, transferring and processing data for visualization on a user interface.

In one aspect, techniques are provided for presenting information on a user interface. A block data interface is defined. Blocks of data are received over the block data interface. Each block of data includes one or more items indexed using one or more dimensions and sharing a display attribute. A mapping definition for the one or more data items is received. A display structure of the one or more data items is generated based on the mapping. The display structure is visually presented on the user interface.

In another aspect, techniques are provided for providing information for user manipulation. Blocks of data are received over a block data interface. Each block of data includes one or more data items indexed using one or more dimensions and share a display attribute. A mapping definition is received for the one or more data items. Calculations are performed based on the received mapping to generate viewable data.

The discloses techniques can be implemented, among other embodiments, on a hardware platform or embodied in a computer program stored on a computer-readable program medium.

The details of above aspects and their implementations are set forth in the accompanying drawings, the description and the claims.

BRIEF DESCRIPTION OF THE DRAWINGS

FIG. 2 depicts an example data view.
FIG. 3 depicts an example of a user control to change viewed data.
FIG. 4 depicts an example of a range panel in a lattice mode.
FIG. 5 illustrates an example of a vector panel and side-by-side formula mapping.
FIG. 6 shows an example of formulas seen by a user.
FIGS. 7A and 7B depict example mappings maps.
FIG. 8 lists an example formula file.

DETAILED DESCRIPTION

Figure 1:
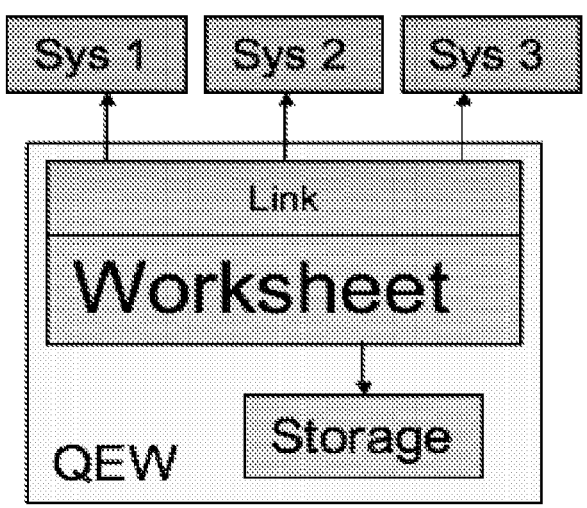
FIG. 1 is a block diagram of a data processing system.

In many commercial systems in use today, databases are used to store data, to perform computations to generate new information and to allow customers or users to browse through data based on their selected criteria. Some examples include financial service providers (e.g., stock brokers), corporations, e-commerce retailers, etc. that allow users to browse through data such as products for sale, stock prices, personal data, and as on.

As useful as these services are, it is often cumbersome for the service providers to make changes to their systems. The system changes may be, e.g., addition of new parameters (e.g., a stock broker may want to start displaying intra-day stock highs which were not previously available to users) or some another functionalities. Such system changes typically require extensive code writing which takes time and resources.

When a user wishes to use information, e.g., for performing calculations or viewing the information in the form of tables or other visual structures, the information may be received from across a network (e.g., the Internet) from another computer (e.g., a web server), or may be locally passed from one module (e.g., a computer connected to a local area network or a local storage) to another module. Compactness and completeness of data is often desirable to achieve the desired outcomes with minimum utilization of resources such as bandwidth and computational power.

Compactness may be achieved by sending the information only once—possibly in a compressed format (e.g., zip or similar encoding)—so that the visualization modules can manipulate the same data to produce views of the data desired by the user.

Completeness may be achieved by providing all the information needed by a device to generate user-desired views of data. For example, completeness may entail providing relationships among different data (e.g., mapping), display attributes to be applied to certain data fields, and so on.

Spreadsheets (e.g., Microsoft Excel) are a popular was of conveying data, relationships among data (e.g., formulas embedded in the spreadsheet) and some visual attributes (e.g., color palette). Some web-based data providers also use proprietary data formats such as pre-defined extensible markup language (XML) definitions for data that is transferred from the web site to a user's web browser. Example data providers include financial data web sites, e-commerce web sites, news websites, and so on.

While traditional spreadsheets are well understood and used in practice, these techniques provided limited functionality in certain use scenarios. For example, spreadsheets are good at presenting two-dimensional (row-column) data views with an additional third dimension accommodated as additional worksheets. However, visualization of overlapping data is problematic.

In another example scenario, a spreadsheet may be useful to enter various data in columns and draw X-Y (or other) plots in which data in one column is plotted against data in one or more other columns Numerous examples are possible, e.g., a list of stocks in one column and a list of current price of the stock in a second column and so on. However, spreadsheets fail to adequately handle situations where data ranges overlap. For example, assume that 3,600 stocks presently traded in New York Stock Exchange may be listed in column 1. In column 2, the user may desire to only computer today's closing costs for stocks that have market cap above $1 billion. In other words, not all data items listed in the first column are to be included in the calculations presented in column 2. Further, in column 3, a listing of today's closing price of all stocks for companies registered in California is to be computed. As can be seen, the data ranges for outputs in columns 2 and 3 may overlap (e.g., some of the same stock entries will occur in both cases, but not all of the entries are identical). Furthermore, certain calculations may use intrinsic items stored at the platform. For example, in the above example, information about which company is registered in which state may not be explicitly listed in a column but may be available for computations using other techniques.

The techniques disclosed in the present document provide solutions for worksheets that meet the above-discussed needs, and others. Section headings have been used only for the ease of understanding and do not in any way limit the scope of the disclosed technology.

Combining data represented as OO (object oriented) classes with tabular formulas and displays is a common necessity. The present document provides a comprehensive solution bases on integer linear algebra, which separates the tasks of representing OO data as arrays, setting up calculations, and visualization.

As an example, a storage format for worksheets linked to OO data is disclosed. Further, an example design of an application to work with it is also disclosed. The result may be a multi-user, scalable spreadsheet-like environment that can be linked to a variety of data sources.

Advantageous features include automatic adjustment to changes in data structure and size, shared views, and an intuitive user interface that encapsulates the abstract concepts.

1. Block-Data Worksheets

A block-data worksheet (BDW) is a representation of visualizations and calculations involving objects, stored in a specific format which may be referred to as a calculation/visualization/data (CVD) format. Viewing and modifying a BDW may be performed using a BDW application, similar to the relationship between .xls and spreadsheet applications like Excel and Open Office. The present document provides several techniques for data presentation, which are further illustrated with reference to the CVD format and the Quick Eye Workbook product, which may be implemented as a hardware and/or software application that uses a BDW.

The CVD format is language independent, with the exception of formula code, which is, e.g., either pure Python, or augmented Python, e.g. with C++ or Java. Two features may be met: providing better capabilities to handle complex data than spreadsheets, and to provide configuration and export facilities to external systems, all in a multi-user setting. This combines the strength of both desktop and shared spreadsheet solutions with the ability of object-oriented data to handle complex data. CVD is work in progress, but provides substantial functionality.

1.1 Suitable System Examples

FIG. 1 shows example architecture of QEW. The Worksheet itself manages tabular layouts of data and the calculations relating them. The Storage is an internal repository of objects, sufficiently versatile to exploit BDW features. Functioning stand-alone, QEW allows working with data in the internal storage, while the Link allows adding external data.

The remainder of Section 1 presents, inter alia, some features of BDWs. Section 2 describes, inter alia, implementations of QEW and Section, inter alia, example of the CVD format, including multi-user behavior. Section 4 discloses, inter alia, BDW features.

1.2 Example BDW Users

The choice of having data stored in a spreadsheet versus a customized system built along object-oriented principles is a common one. Both solutions have their advantages. On the spreadsheet side there is adaptability, cost and a shallower learning curve; all data is easy to see, understand how it is arrived at, and modify. A customized system gives up on most of that, but gains scalability, speed, better user interfaces, and can therefore can handle much more complex data.

Whichever solution is chosen, the advantages of both are desirable. A spreadsheet can benefit from the discipline of object-oriented design, and customized systems need configuration and post-processing of data that are easier done in a spreadsheet. Not surprisingly, spreadsheets are often augmented with functionality via add-ins developed in C++ or Java, while customized systems have import/export facility to/from tabular formats or .xls.

BDW may be used by users working at confluence of these two approaches. This includes working with complex spreadsheets, especially in the enterprise environment, as well as configuring data in customized systems, producing reports, or running scenarios based on external data. The two tasks are often joined, as it is common for large spreadsheets to be fed data automatically.

Some features of BDWs are:
1. Interface easily with existing systems developed in varied programming languages, at a minimum C++, Java and Python.
2. As stand-alone, provide means to organize data as types with attributes, by purely graphical means.
3. Access the object-oriented representation of data in the worksheet.
4. Provide a rich-enough formula syntax to address most data configuration issues.
5. Easy imports/exports from/to .xls and other tabular formats.
6. Automatically adjust to changes in the amount of data, e.g. array sizes.
7. Be a multi-user solution.
8. Store data in a scalable back-end, such as a database management system.

While spreadsheets provide a large variety of features, such as charts, pivot tables, formatting etc., some features stand out:
1. Laying out data in tabular form.
2. Writing formulas in cells, which are executed in the correct order.
3. Replicating formulas over ranges.
4. Using ranges as formula inputs, e.g. SUM(A1:D10).

These features are present in BDWs as well, with some modifications.

The starting point is laying out data. Consider a simplified case of working the medical history of kids of families, stored by a hypothetical system called MedData, that QEW has been connected to via the Link (FIG. 1). The organization of data might be:

| | | |
|---|---|---|
| Visit: | Hospital visit. | |
| | date: | Date of visit. |
| | cost: | Dollar amount. |
| Condition: | One instance for each time a child got sick. | |
| | date: | Date diagnosed. |
| | diagnosis: | Name of condition. |
| | visits: | List of hospital visits in chronological order. |
| Child: | Individual child data. | |
| | name: | First name. |
| | sex: | Sex of child. |
| | dob: | Date of birth. |
| | history: | A list of Condition instances, with the most recent first. |
| Family: | Represents 1 family. | |
| | name: | Last name. |
| | children: | Array of instances of Child, eldest kid first. |

A simple request would be a summary table of past conditions of each child. One issue to consider, not present when data are numbers or strings, is whether to what to appear in the table. Condition has more than one field; diagnosis seems reasonable, as long as it is short enough to appear in a table. As that may not always be the case, implementations may leave it to each individual type a data to decide what to display. All data used by QEW, which is referred to as block data, is required to implement a method shortName( ).

If the family's data is exported to .xls, the most natural representation would be one sheet per child (there are not too many), one line per condition (there could be quite a number of them, hence the vertical direction is best), with the data for visits put on one line, taking 2 columns per visit for date and cost. The first column could be the short condition name, necessary in this case as well. The table can be built by collecting data from the individual child pages, albeit with some work.

In a BDW, the table is created by defining a mapping for the data, which describes how the data is laid out. In this case a[R,C]:=Jones.children[C].history[R] would be a suitable mapping description, requesting that the data appear starting at coordinates (R=0,C=0), which children by column. The mapping is given the name a, which can appear in formulas as a reference to the data.

Variations are possible. a[R,C]:=Jones.children[C−3].history[R−2] would start the data at (R=3,C=3), while a[R,C]:=Jones.children[R].history[C] would show the children vertically, with conditions in columns.

The mapping description can be edited, in which case the formatting changes to show mapping coefficients:
a[R,C]:=Jones.children[0*R+1*C+0].history[1*R+0*C+0]

The numbers in blue can be typed in or increased/decreased by 1 with the mouse. The steps to creating a mapping can include the following:
1. Choose the target, in this case the object Jones.
2. Choose a sample. As a user could be interested in any of the available data, e.g. birthdays or names, one of the items of interest must be pointed to. The first condition of the first child, i.e. family.children[0].history[0], works.
3. Choose the type of mapping a user wants. A item mapping is used for a single object or value, a vector mapping for a sequence, and a range mapping for a table. In this case, choose range.
4. Choose the name of the mapping, e.g. a, b, c, . . . .
5. Choose where in the grid a user would like the sample to appear, (R=0,C=0). This is called the anchor.
6. Choose how cells are linked to data. The default uses coordinates in order, giving a[R,C]:=Jones.children[R].history[C].
7. Optionally, define an area to limit the mapping to.
8. Map the data. The result may not be rectangular, as the number of past conditions can vary from child to child.

This approach gives a lot of choice as to how data is shown. However, it creates two differences between BDWs spreadsheets:
1. Different mappings are allowed to overlap, as from an anchor and a sample alone because an implementation cannot anticipate where data will land. The amount of data items may change from a session to the next, as BDWs work with data available to multiple users.
2. The layout is infinite in all directions, for the same rationale.

There are some benefits. Suppose, a task is to add two columns, containing the names and birthdays of each child. With conditions starting at C=0, an embodiment can use columns −1 and −2, without needing to shift data. The mappings would be b[R,C]:=Jones.children[R].name, limited to C=−2, and c[R,C]:=Jones.children[R].dob, limited to C=−1. Without a limit, the mapping is interpreted as a request link all columns to data, and may fail.

With data mapped, formulas can be set up. BDW allows expressions that involve mapped objects, applicable uniformly over a region called the formula's domain. The closest spreadsheet equivalent is a group of cells with the same formula (allowing for relative cell references). As an example, an embodiment can create a column with the children's ages.

The first step is to decide how the computed ages will be stored. Unlike a spreadsheet, which stores the data in a .xls file, a BDW stores its data either in its internal storage (FIG. 1), or in external systems it is linked with. Any data in a BDW worksheet must belong to an object, which once created can seen by other users.

As likely MedData does not provide a facility to allocate objects, an implementation can turn to the internal storage and request an array named ages. For size, an implementation can use the mapping b, which displays children's name in column −2. An implementation can create a mapping d[R,C]:=ages[R], limited by R=−1. It is deliberately chosen to occupy the same coordinates in the grid as the birthdays, as an example of how overlapping mappings work.

Before an implementation can compute the ages, the implementation may get today's date. An internal object today may be available, and an implementation may do an item mapping e=today; no anchor is necessary in this case. The age formula can now be written as d[R,C]=c[R,C]−e, with domain c, which can be shorthand represented as c::d[R,C]=c[R,C]−e.

A worksheet can be asked to calculate its formulas. This request will result in the formulas being iterated over their domains, and the objects being updated.

The user interface provides a number of facilities to deal with the overlapping mappings c and d. There is a stacking order, which determines which mapping appears on top; mappings can be brought to the top by clicking on them. There are two modes for a grid display: value and lattice. In value mode, cell values are shown, and only cells on top are visible. The lattice mode is a schematic diagram that allows seeing which areas mappings occupy, and mappings are visible simultaneously. This can be seen in FIG. 2, FIG. 3 and FIG. 4.

FIG. 2: The range panel displays range mappings and formulas with 2-dimensional domains. DOB is on top, with yellow button depressed. Pressing a button puts the mapping on top.

FIG. 3: The range panel: age on top, green button ("h") depressed.

Information inside mapped items of data can be accessed. For example, as a [0,0] is the first condition of the first child, the formula e::e=a[0,0].visits[0].cost will result in e showing the cost of that visit.

The names of the variable used to span areas are determined by the type of mapping. Item mappings do not require iterations, hence no variable name is needed. Vector mappings use N, range mappings (R,C) as seen, and 3-dimensional mappings (X,Y,Z). In this example, the hospital visits form a 3-dimensional dataset. It can be mapped as follows:

g[X,Y,Z]:=Jones.children[X].history[Y].visits[Z]

FIG. 4: The range panel: lattice mode.

Formulas can be used to compute the total cost of visits. After requesting a new variable totalCost from the internal storage:

h:=totalCost
h=sum([g[X,Y,Z].cost for (X,Y,Z) in g])

BDW formulas may use Python syntax, and the Python interpreter for execution; the above expression highlights Python's versatility.

Formulas require correct ordering. Suppose an implementation wanted to create a Fibonacci sequence in an array fib obtained from Store:

b[N]:=fib[N]
c=S(0,1)
d=b−c
c::b[N]=1
d::b[N]=b[N−1]+b[N−2]

The result is shown in FIG. 5. The first line creates a vector mapping, using the variable N. The second creates a set c={0,1} by enumeration; the command can be given either as text, or graphically. The third line creates a set with the elements of b, except 0 and 1. For example, if fib has indices 0, 1, . . . , 9, one can get d={2, 3, . . . , 9}. Finally, the two formulas needed are set, 1 on c and the recursive formula on d.

An key observation is that the size of fib is not used explicitly; the code can be rerun after the size of fib has changed, and produce a complete result. This is in marked contrast with a spreadsheet.

Back to the ordering issue, the correct result will be obtained only if c is iterated over before d, and d is enumerated in the correct order. To insure this, the code is automatically analyzed to infer the correct order.

While this section has provided a high level overview, the reader should have a general idea of some of the benefits of BDWs, as well as differences from spreadsheets.

1.4 Further Examples of BDW

For complex spreadsheets, better ways to structure data are needed, as it is difficult to squeeze everything in 2 dimensions. An important first realization is that linear maps can be the intermediary between cell layouts and object-oriented data, which is a proven way to deal with complexity. The price paid is that data ranges may overlap.

FIG. 5: The vector panel displays side-by-side vector mappings and formulas with 1-dimensional domains: b maps the vector fib. In blue (column "c"), c={0,1} is the domain of b[N]=1. In yellow (column "d"), d={2, 3, . . . , 9} is the domain for b[N]=b[N−1]+b[N−2]. d is selected, and its formula is visible in the upper-right corner.

Integer linear algebra is more abstract, and makes it harder to build a user-friendly interface. The mapping editor is a case in point, where changing coefficients for R and C is a marked improvement over editing a matrix. Python-interpreted set operations and GUI solutions can be combined to work with subsets of $Z^n$, including some infinite sets (see 2.1). The lattice mode (FIG. 4) is quite useful for visualizing overlapping sets; while seemingly simple, it took effort to arrive at.

Set operations turn out to be the correct solution for avoiding explicit references to array sizes in calculations. On the other hand, displays consisting of disjoint areas can be created automatically by specifying geometric relationships (see 2.6). This brings full circle the idea of separating calculations from visualization: even if the purpose is disjoint 2-dimensional layouts, it is better achieved using overlapping sets as an intermediate result. The result feels much like a spreadsheet, yet powerful options are available.

Every spreadsheet environment needs a simple formula syntax. The one presented combines mappings and data arrays with the same notion, and is easy to use. However, the key to making it work is being able to order calculation steps automatically. The execution graph of a spreadsheet is easy to compute from cell inputs, but arbitrary formula code is more difficult.

With visualizations separate from calculation, and objects external to the workbook, it becomes possible to have saving formats that work well in a multi-user setting (Section 3). One idea is for the format to consist of elements that can be modified individually, with as few adjustments as possible when another portion of the data is changed.

2. QEW Implementation Examples

A spreadsheet can be thought of as a set of data indexed by a triple of integers (sheet, row, column) ∈N3, with ranges the basic building block for formulas. This is not a natural way to organize data and set up formulas, but rather the effect of visual limitations that privilege 2-dimensional layouts: a 1-dimensional one is inefficient, while a 3-dimensional one cannot be seen.

BDWs are based on the idea calculations and visualizations can be solved better separately: first map the data in a natural way, then use appropriate tools visualize the result. 2.1 through 2.5 describe mappings, formulas and calculations with little reference to visualization, which is subsequently addressed in 2.6 through 2.8. Combining the two approaches recovers familiar 2-dimensional displays, while maintaining a natural organization for data.

2.1 Areas

Both mappings and formula domains are defined by subsets of Zn, which is referred to as areas. Points of areas are represented as integer tuples. The 0-length tuple ( ) is the unique element of $Z^0$, and for consistency the elements of $Z^1$ are written (i,). The length of the tuple is the dimension of the area it belongs to.

Areas can be described by enumeration or as given as restrictions, which are convex sets with linear sides; the latter can be infinite. Embodiments disclosed in section 1.3 used the infinite restriction $\{R=-1\} \subseteq Z^2$ to limit a mapping; other important examples are the entire line or plane $\{-1\} \subseteq Z^2$ (Z and $Z^2$), and the main quadrant $\{R \geq 0, C \geq 0\}$.

Restrictions can be stored on a computer in a compact way using the equations that define them. The intersection of two restrictions is a restriction, and can be computed by putting together the equations. The union is in general is not a restriction. A restriction need not be infinite. The set c={(x,y,z)∈$Z^3$|1≤x,y,z≤100} is a cube with 1,000,000 elements, and the restriction description is much more efficient.

The Python interpreter can be created used to create areas, either with constructors or via operations; a&b, a|b, a−b and a*b denote intersection, union, difference and the cartesian product. Set operations involving mappings allow calculations to self-adjust to array sizes, as already disclosed in the Fibonacci example of 1.3.

A few examples:
1. a=I(1,100). Creates a 1-dimensional range.
2. b=I(1,20)*I(−10,10). Creates a 2-dimensional rectangular area.
3. a=S(1,3,7,8,13), b=S((1,2),(2,3),(−10,−20)). Arbitrary enumeration. Except for dimension 1, the arguments must be tuples.
4. a=L(1,2,3,4). The integer entries of the line passes through (1,2) and (3,4).
5. a=H(1,2,3,4). The half-plane to the left of the line above. For the right half-plane H(3,4,1,2) can be used.

Infinite restrictions can only be used in intersections, or in a cartesian product with another restriction. A finite restriction can be used in all operations, but will be converted into an enumeration first.

Some areas can be created graphically, if the inputs needed can picked up automatically, e.g., when creating a range with the mouse. Both enumerated sets and restrictions implement the Area interface:

Area:
bounds( ): Provides a parallelepiped B⊆$Z^n$ that encloses the area. Necessary for extractions, and for computing scroll areas.
in(coord): Tests if coord belongs to the area.
enumerate( ): Lists the elements in the set. Raises an exception if the area is infinite. Used for mappings and iterating formulas.
volume( ): For enumerated sets, it is the number of elements. For restrictions, it is the geometric volume as a subset of $R^n$, perhaps+∞. It is used as a test whether the restriction is infinite or not, and to estimate how long an enumeration might take. The volume tends to be numerically close to the number of elements.
center(coord): Used to scroll a display where the set is. coord is the current scroll location, necessary e.g. to bring a half-plane to focus.

Implementing the Area interface for enumerated sets is obvious. That is not so for restrictions, but it can be done by relying on known algorithms with available open-source implementations. Quantitatively the size of the problems BDWs encounter are small, and fall well within the spectrum of the algorithms used.

bounds( ): This can be reduced to linear optimization, which can be solved by the simplex algorithm. If R⊆$R^n$ is a restriction $\max_{x \in R} x^i$ will compute the upper bound of the i'th coordinate.
in(coord): This is the only easy method. It suffices to test each defining inequality of R.
enumerate( ): This is done by reducing the dimension:
1. Compute lower and upper bounds $m_i, M_i$, i=1, . . . , n, to see if R is finite.
2. Iterate for $m_n \le i \le M_n$, and enumerate the intersections of R with {$x_n$=i}. The dimension will be lower by 1. For dimension 1, the only finite restriction is an interval.
volume( ): This is also done by reducing the dimension. The steps are:
1. Compute vertices. For a relatively low number k of equations, the face lattice (including vertices) can be computed by inspecting all combinations of equations, of which there are $2^k$. This is sufficient for the needs of a BDW.
2. Slice R with (n−1)-planes perpendicular to the n'th direction at all $x_{n,i}$,i=1, . . . , p that occur as the n'th coordinate of any vertex. Compute the (n−1)-volume of each section. The result is a sequence of section volumes {0=$v_0$, $v_1$, . . . , $v_p$=0}.
3. Compute the n-volume as $\Sigma_{1 \le i \le p}(v_i+v_{i-1})(x_{n,i}-x_{n,i-1})/2$. For a 1-dimensional restriction, the 1-volume is the length of the interval.

center(coord): The steps are:
1. Compute the lattice as for volume.
2. Choose all the lattice elements of minimal dimension.
3. Compute the closest point to coord for each of them. This is done by quadratic optimization, a standard algorithm in operations research.
4. Return the closed point to coord from among those computed at the previous step.

2.2 Block Data

All data QEW works with, e.g Family, must implement the BlockData interface:

BlockData:
id( ): A unique identifier for the object.
retrieve(id): A static method that retrieves an object from its ID.
shortName( ): A string to be displayed in a cell, as in the case of an array of Condition instances.
block(label): Returns the block associated with label. Data is presented in blocks, finite areas meant to be iterated over. Blocks are parameterized by strings called labels. Family has two labels name and children. The name block consists of the unique 0-length tuple ( ), while children consists of the tuples (1,), . . . , (N,), where N is the number of children.
dim[ ]: A static dictionary with labels as keys, and block dimensions as values.
get(label, coords): The content of the object in block label at coords. If coords does not belong to the block, an error is raised. Jones.get('children',2) returns second child, and Jones.get('name',( )) will return Jones.
set(label, coords, val): Replaces the content of the block label at coordinates coords with val.

Multiple blocks are necessary as a data type needs to expose more than one category of sub-objects, and the assumption is that the entries of blocks are homogeneous. The elements of the children block of Family are of the same type, with e.g. history found in all.

Data intended to be modified in the worksheet should be exposed by blocks. While other attributes can be seen in the worksheet, changes outside blocks cannot be monitored, and thus the workbook cannot know which objects must be saved.

2.3 Mappings

As disclosed in 1.3, mappings, allows data to be displayed and used in formulas. The steps of creating a mapping correspond to the attributes of the Mapping class:

Mapping:
target: An instance of BlockData. Denote it by τ.
path: A sequence $\pi=(l_i,p_i)_{1 \le i \le d}$, with $p_i \in Z^{m_i}$ and $l_i$ strings. The target and the path together determine the sample s, defined as s=$s_d$, where $s_0$=τ, $s_i$=get($s_{i-1},l_i,p_i$), i=1, . . . , d.
d is called the depth of the mapping, while ‖s‖=1 $n_i$ is the sample dimension. The vector $c_s \in Z^{\|s\|}$ obtained by concatenating $p_1$, . . . , $p_n$ is called the sample coordinates.

anchor: A point in α∈$Z^n$. n is called the layout dimension, and is the number of coordinates data will be laid out in. a is called the anchor; this is where the sample will appear in the layout.

factors: A ‖s‖×n-matrix Q with integer entries, called the mapping factors. This de-scribes what is displayed at a given coordinate x in the layout, according the following steps:

limit: A set $A_{max}$⊆Zn as in instance of Area. $A_{max}$ limits the scope of the mapping.

Data is displayed at a given x∈$A_{max}$ if the following steps succeed:

1. Compute y=Q(x−a)+$c_s$∈$Z^{‖s‖}$.
2. Decompose y=[$y_1$, . . . , $y_n$],$y_i$∈$Z^{ni}$ (the reverse of computing the sample coordinates from the path).
3. Compute e(x)=$e_{d(s)}$, where $z_0$=τ and get($z_{i-1}$,$l_i$,$y_i$), i=1, . . . , d(s).

The data displayed is e(x); the set of coordinates displaying data is called the matched area.

The matrix Q comprises the mapping factors (section 1.3). Mapping formulas are simply a readable matrix editor, with the identity matrix giving the default. Using matrices treats uniformly issues like transposing data and having different layout and sample dimensions. For example, a range mapping of hospital visits for the last condition of each Jones child of 1.3 is given by:

1. Target: Jones.
2. Sample: Jones.children[0].history[0].visits[0], with path [('children',0),('history',0),('visits',0)].
3. Anchor (1,1).
4.

$$Q = \begin{bmatrix} 0 & 1 \\ 0 & 0 \\ 1 & 0 \end{bmatrix}.$$

This causes (R,C) to display f.children[C].history[0].visits[R], i.e. a child per column, with visits vertically.

$A_{max}$=$Z^n$ results in the entire dataset being displayed; as that can be large a smaller $A_{max}$ is an option. $A_{max}$ is necessary when the matched area would be infinite otherwise. If V is a vector, a[R,C]=V[R] works irrespective of C. $A_{max}$ specifies which column to use; repetitions can occur.

The matched area is computed algorithmically, and infinite sets detected. For most worksheets, the mapping time should not be an issue in comparison to calculation time, and it should be intuitive that extracting a full cube with 1,000,000 entries can take some time, especially if the block method of mapped objects is inefficiently implemented.

The matched area can be computed by enumeration if $A_{max}$ is finite. If $A_{max}$ is a restriction, either finite or infinite, a more efficient calculation can be done using the BlockData.bounds( ) method to compute a cube C all sample siblings are confined to. A cube is restriction, hence so is $Q^{-1}$(C)∩$A_{max}$. Area.volume( ) gives an estimate of how much data will be extracted, and Area.enumerate( ) is used to compute the matched area.

2.4 Formulas

As seen in 1.3, formulas are code that is executed over a finite area. Formulas are instances the Formula class:

Formula:
A calculation step to be performed uniformly on a domain.
AXES: A static const member, containing symbols for the coordinate axes. An example would be ((N),(R,C),(X,Y,Z),(X1,X2,X3,X4)). Without axes names, the code in formulas cannot be understood.
domain: An instance of Area representing a finite set.
code: A string containing the code to be executed.

While the representation is simple, formulas are a complex topic. Implementations should be able to input them conveniently, and to execute them. Consider these questions in reverse order, as before designing an editor one needs to know what is to be edited.

2.4.1 Interpreting Formulas

Combining mappings and blocks in the same syntax makes writing formulas easy, but com-plicates execution, as they need to be translated into get( ) and set( ) calls. Consider the following example:

1. a[N]:=Jones.children[N]: Assign children to a.
2. b[R,C]:=Jones.children[R].history[C]: Assign conditions to b.
3. c=a−S(0) Next operation uses N−1, and there is no −1 child.
4. c::b[N,0]=a[N−1].history[0]. Copy the first condition to the following sibling.

The example has no practical value, but is a good illustration of the steps that must occur:

1. Recover the object childA a[N−1] refers to: childA=Jones.get('children',N−1).
2. Recover condition=childA.get('history',0).
3. Recover the object childB that contains b[N,0]: childB=Jones.get('children',N).
4. Change childB: childB.set('history',condition,0).

Interpreting the formula requires obtaining attribute strings from "." notation, e.g. 'children' from Jones.children. In Python, attribute access can be customized by re-defining the getattr and setattr. If X is such a class, and x is an instance of X, x.m=100 becomes setattr (x,'m', 100). Additionally, index operations called by expressions of the form a[i]=b[i] can be customized by writing getitem and setitem methods. Thus a BDW implemented in Python can execute formulas directly, without the need to define a custom formula language.

As an application of BDWs is exporting and configuring data from external systems and Python is not a common language for large scale systems, implementation may include a method to use the syntax for other languages, especially C++ and Java. There are a few options:

1. Extend Python. This is the easiest route, as a BDW can be written in Python as discussed above. The disadvantages are that ever block data class must be mirrored in Python, and does not allow compiling the spreadsheet, to gain efficiency. Extending Python with wither C++ or Java is a well understood process, with a large community and knowledge base.
2. Use a language specific BDW formula syntax, so that formula code can be executed directly. This is not attractive, as users of BDW must learn different versions of syntax. Moreover, given Java syntax, set calls would have to appear explicitly, making writing formulas awkward.
3. Give a formal description to the BDW formula language, and write a compiler for all relevant languages. This is feasible, albeit not without some work. Working with regular grammars is well understood, and the BDW formula syntax falls under this category. The benefits are compiling spreadsheets, for substantial efficiency gains, and simplifying the process of writing BlockData methods; the developers that build the external system would not need to know Python, and how to extend it.

Following describes a way to combine 1) and 3). The BDW is written in Python, but creates native code (e.g. Java or C++), that can be compiled and loaded on the run. It also provides a benefit to the Python case, by allowing to automatically adjust formulas if a mapping is moved (translated) do a different location (2.6).

The principle is to write Python classes that when used in expressions generate native code, by writing the appropriate attribute and index access methods. In effect, this amounts to writing a compiler for the BDW formula language in Python.

FIG. 6 shows an example. (A) shows the formula as seen by a user. Blue text represents native code, while black code is BD code. To see why the distinction is necessary, consider the formula a[2**N]=100. It is correct Python code, but not C++ or Java, and is not related to the issues BD handles.

(B) shows how the formula is stored internally. Native code is enclosed by delimiters # or $, which the user does not see. The difference between the two can be seen for the first two items of native code. fact (must be joined to the BD token c to its right, and X is isolated.

In (C), the native code snippets are wrapped by instances of the Code class. The semantic difference between $ and # is that a + is added for $. (C) is correct Python code, and executing it produces (D).

The output (D) consists of calls to generic functions:
1. GET(objectId, label, coord): Retrieves child object in block.
2. SET(objectId, label, val, coord: Sets child object in block.
3. LIN(mappingId, b, e, coord): Maps coord into an integer tuple r (corresponding to an object in the target), and returns r's components with index {b,b+1, . . . , e−1}. The result is used as coordinates for the sequence of get required to access an object of a mapping. See also Mapping.map in FIG. 7A and FIG. 7B.
4. IDT(coord): Identity function, returns coord. Used to simplify the generating code.

(D) can be compiled in the native language, as disclosed in the next section. The generated code can be varied to suit a particular language. For example, (D) as displayed in the figure assumes calls of the form object.get(label,coord) can be made, with label a string. For a strongly typed language this may not be possible, as the returns of get are of different types. In that case, the generated code ought to look like GET_label (see also 2.2, method get, footnote).

FIG. 6: Formula (A) uses mappings a,b,c referencing the object x (id 555). The screen displays native code fragments in blue. The internal representation is (B); #,$ delimit native code, with $ "joining" code to the adjacent token. Translation computes (C), a correct Python statement. Native code is wrapped by Code instances, and + replaces $. Executing (C) generates native code (D). (ABC-Py) uses correct Python syntax throughout. Attribute .w is preceded by the escape sequence ( ), to be distinguished from labels.

As this process is somewhat technical, FIGS. 7A, 7B and 8 show stripped-down functioning code that produces (C) and (D). The general idea is that a class is associated with each state of evaluating the expression, and the required transitions are implemented.

While the same result can be achieved by a special-purpose compiler, using Python classes has the advantage BDW grammar can be easily extended by adding classes to the ones of FIG. 7A and FIG. 7B, in a way compatible with regular Python syntax. An example is computing the sum of values over a set. In Python, one can write a function Sum, such that for example b[N]=Sum(a, lambda R,C: a[N,C]) works as expected. A Sum class that generates equivalent C++ or Java code is easy to write. When writing a formula, Sum would be BD code, not native code, as it is part of the expanded grammar (see also 3.1).

Finally, for Python alone, the need for the distinction between native code BD code can be eliminated, by using ( ) to escape BD code, and use object attributes that have not been exposed as labels. This is done by adding a _____call_____ method to the Reference class of FIG. 7A and FIG. 7B, which turns into a callable object. _____call_____ obtains the required object, which will be an instance of BlockData, hence normal syntax applies. In FIG. 6 (ABC-Py), w is an attribute, not a label, hence it is preceded by ( ).

If the goal was only to get BD formulas to work in Python, this syntax can be accommodated by implementing _____getattr_____, _____setattr_____, _____getitem_____, _____setitem_____ and _____call_____ methods for the relevant classes. This however makes it hard to handle purely formal tasks, such as adjusting formulas after translating mappings.

2.4.2 Editing Formulas

Grammar-specific editors that provide syntax highlighting and auto-completion are common, and only a few specifics are discussed herein.

Native and BD code are visually distinct, and the $ separator recognizable. Auto-completion can rely on all tokens being known. As mapping and label dimensions are known, an opening square bracket is completed with a matching right one, with the correct number of commas in between.

The important feature of adding cells to formulas by clicking is more complex. Consider the example of typing a[R,C]= . . . and clicking on b[10,20]. What should the relationship between (10,20) and the abstract symbols (R,C) be?

The solution involves a few elements:
1. Inserting a cell into a formula requires a selection with the same dimension as the domain of the formula being edited, e.g (4,11) for the case above.
2. Create the insertion formula in the same way a mapping uses an anchor and sample. In this case it would result in a[R,C]=b[R+6,C+9].

This works even when the dimensions are different. Clicking on c[100], with c a vector mapping, gives a[R,C]=c[R+96]. A matrix is automatically created, initially the identity.

3. Allow editing the coefficients as for a mapping, i.e. a[R,C]=c[1*R+0*C+96]. As for mappings, changing coefficients automatically adjusts the constant term, e.g. switching to C results in a[R,C]=c[0*R+1*C+89].

FIG. 7A, FIG. 7B: File compiler.py.

FIG. 8: File formulaExample.py 2.5 Calculations

Formulas are grouped in units of execution called calculations. Executing a calculation is similar to recalculating a spreadsheet. A calculation consists of formulas and mappings, with mappings assigned a symbol. Every symbol used for a mapping inside a formula must appear. There can be more than one calculation, and calculations can share both formulas and mappings. The class representation is the following:

Calculation:

mappings: A dictionary of instances of Mapping indexed by symbols. With the example used, the symbols would be a, b, c . . . . The symbols should not overlap with the AXES in Formula.

formulas: A list of formula instances.

The calculation must iterate over all execution items, pairs (f, c), with f a formula and c a coordinate in its domain, in the correct order. This is done as follows:

1. If not using the simplified Python syntax, compile the formulas as described in 2.4. This results in native code involving mapping and axes symbols.
2. Generate code that provides the formulas with the missing symbols, and compile the resulting code.
3. Run the resulting code, collecting information about calls to get( ) and set( ).
4. Use the collected information to compute the correct order of execution.
5. Re-run in the correct order.

For Step 1, use the methods of 2.4 to translate the formulas into calls to functions GET(object,label,coords) and SET(object,label,coords,value), which in turn call the objects' get( ) and set( ) methods. This insures the calls can be logged. GET and SET are easy to implement.

Step 2 is straightforward. The generated code can look along the following lines:

def f1(a,b,c,d,N):
    expression 1 involving a,b,c,d,N (in native code).
def f2(a,b,c,d,R,C):
    expression 2 involving a,b,c,d,R,C.
def f3(a,b,c,d,X,Y,Z):
    expression 3 involving a,b,c,d,X,Y,Z.
    c[X,Y,Z]=100*d[X]

There can be multiple functions for with the same dimension

F=(f1, f2, f3, . . . )
Def run(targets,execItemss):
a=targets[0]; b=targets[1]; c=targets[2]; d=targets[3]
for f, coords in execItems:
dim=len(coords)
if dim==1:
F(f)(a, b, c, d, coords[0])
if dim==2:
F(f)(a, b, c, d, coords[0], coords[1])
else: #Only dimensions 2 and 3 appear among the formulas.
F(f)(a, b, c, d, coords[0], coords[1], coords[2])

Compiling and loading this code makes run(mappings, steps) available to execute sequences of execution items.

For Step 3, run the execution items in any order, logging calls through GET and SET. As an implementation logs calls, it may construct a directed graph with two types of vertices:

1. Execution items.
2. Accessed objects. An object vertex is labeled with the unique identifier provided by BlockData.id( ).

During the 1st call to run( ), for every execution item EI may do the following:

1. If either GET or SET calls an object's get( ) method, and edge is drawn from the object to EI. The object is an input for EI.
2. If SET calls set( ), an edge is drawn from EI to the object. The object is an output of EI.

Ordering is based on the following:

Definition 1

A sequence of execution items $e_1, e_2, \ldots, e_n$ is called contradictory if there exist an object x and i≤j such that x is an input for $e_i$ and an output for $e_j$.

This is intuitive. A spreadsheet calculation (without circular references) is a formula, in the functional programming sense, or mathematical sense, not generic programming A formula is a set of values based on each other, and each, once computed, is immutable. This excludes cases like x=x+1, or y=x+1,z=y*2,x=z. Once a value is used, it can no longer be modified.

Proposition 2 Given a set of execution items:

1. If the graph is cyclic, every ordering of the execution items is contradictory.
2. If the graph is not cyclic, every increasing ordering of the execution items is non-contradictory.

Proof:

1. Choose an ordering, and C={e1, e2, . . . , ek, x1, x2, . . . , xm} be a maximal cycle of the graph (strongly connected component), with execution items numbered as they appear in the order. Choose any $(x_i, e_1)$ incoming edge; one exists given C is a cycle. $x_i$ must also have an incoming edge $(e_j, x_i)$. Thus $x_j$ is an input of $e_1$, and an output for $e_j$, hence the ordering is contradictory.
2. If x is an output of e, (e, x) is an edge. If x is an input of e', (x, e') is a edge. This implies e≤e' in the partial order of the graph, hence e precedes e' in the order.

Listing a directed graph in ascending order is a known algorithm; it fails only if the graph has cycles. This completes Step 4. Step 5 simply calls run( ) with execution items ordered correctly.

For this scheme to work, the calculation must produce the same result if run twice in a row. This should be in most cases. Any changes in the graph between the 1st and 2nd pass can be detected, and an error raised. To know what to avoid, here is an example that triggers this error:

a[b]=a[2]+1
b=1

If initially b=0, and the formulas are executed in order, the object/step graph will be acyclic, but still determine the reverse order is correct. The second pass will find a[1] an output, which is a change in graph, hence an error is raised.

This is indeed a limitation of our method, though not very common in practice. There are a number of possibilities:

1. Repeat the calculation. Can address a large number of cases, but is somewhat ad-hoc.
2. Allow some user-defined prioritization of formulas. This is the same as separating a calculation into parts, to be executed sequentially. It is better, but does require using Python scripts.
3. Do not allow objects to appear in indices. This removes the problem entirely, at the cost of having a less flexible formula syntax. This could be the default setting, with the idea switching it off is done when someone is more knowledgeable.

2.6 Moving Sets

Even though working with overlapping sets is facilitated by a number of QEW features, for certain tasks, such as delivering a BDW to end users or exporting to .xls, disjoint matched areas are desirable. In BDW this is accomplished by rearranging mappings, using the following tools:

Translation: A mapping can be shifted by editing the anchor. For the semantics of the calculation to remain the same, formulas that involve the mapping must be adjusted. If one translates a 2-dimensional mapping a by 10 columns to the right, all arguments on the 2nd slot must be incremented by 10. For example, b[I]=a[I,I] becomes b[I]=a[I,I+

10]. To make sure something like b[I]=a[I,I==5] does not change meaning, parentheses must be added, i.e b[I]=a[I,(I==5)+10].

Formula interpretation (section 2.4) can determine the mappings used by a formula. As it also understands index semantics, and code locations can be obtained using the Python ast module, the above change can be done automatically using a variation of the code in FIG. 7A and FIG. 7B.

The result is not quite ideal, as translating back and forth accumulates changes, e.g. b[I]=a[I,((I==5)+10)−10]. While some methods can be devised to mitigate this problem, translating mapping to avoid overlappings is not in the spirit of BDW. Sets should be laid out so that the formulas are simplest; there is an advantage to seeing a[I]=b[I]+c[I] for three vectors, rather a[I]=b[I+50]+c[I+100], obeying the principle of separating calculation from presentation.

Aliasing: The preferred solution to moving mappings is to use mapping aliases. An alias shares all the attributes of an original mapping, except the anchor. An alias cannot be used in formulas and can be freely translated, making automatic tiling useful. Editing a value in the alias is equivalent to doing it in the original, making the alias a functional copy. Aliases are stored as an offset vector, making translation easy.

Tethering Mappings and aliases can be attached to each other via tethering. Tethering is done based on a list of bindings consisting of:
1. Base. A mapping or alias, the fixed end of the tether.
2. Follower. A mapping or alias of the same dimension as the base. The follower will be positioned relative to the base.
3. Direction. A vector. The line from the base's anchor to the follower's anchor will be parallel to it.
4. Minimum distance. The follower will be placed at the minimum distance for the closest point to the base where it fits, moving along the direction. If the minimum distance is 1, and the direction is vertical, two rectangular areas will be places with 1 spare row in between.

The tethering order number must be lower than that of the base. The tethering algorithm is as follows:
1. Place all the items that are not a follower. They can overlap.
2. Pick the item with the lowest tethering order number, and place it relative to its base. Its rectangular enclosure will not intersect any of the already placed areas' rectangular enclosures.
3. If any of the moved areas are mappings, not aliases, adjust formulas by iterating over them.

The result is disjoint areas, aside from overlaps among bases, and semantically equivalent formulas (see 2.6).

2.7 Display Organization

The display is designed to handle a fairly large number of potentially overlapping areas. It consists of a number of rectangular grids that can be viewed in parallel, one or more for each dimension used. All areas, whether associated with mappings, formulas or unattached are organized in groups, and each grid shows one group at a given time.

A group is a set of areas to be viewed together, similar to a sheet. Scrolls and selections are kept on a per group/per grid basis. Within a group in a grid, areas are displayed according to the stacking order, similar to windows on a desktop.

Grids of dimensions 2 and higher can be in values mode or lattice mode, toggled with a button. In value mode, data from mapped objects is shown, and areas higher in the stack obscure lower ones. An area can be raised to the top by clicking on any of its visible values, or by pressing a separate control button.

The lattice mode shows the areas sharing a coordinate set as colored icons (FIG. 4); values are not displayed in lattice mode. Clicking an icon within a cell raises its area to the top of the stack, and exits the lattice mode.

A set can be centered (brought to view) within a grid. The effect differs from finite and infinite sets, and is determined by the Area.center( ) method (see 2.1).

2.8 Dimensions 3 and Higher

Displaying higher dimension areas is done with 2-dimensional grids using sections. A section is a vector $s \in Z^n$, together with two integers $1 \le r \ne c \le n$. For $A \subseteq Z^n$, an implementation can display $A(s)=\{(i_1, i_2, \ldots, i_n) \in A_1 i_j = s_j, \forall j \ne r, c\} \subseteq Z^2$ by placing its entries at $R=i_r, C=i_c$.

To make use of all sides of the display two more directions' coordinate labels are displayed along the bottom and right (for n=3 only bottom), used for changing the section by clicking. In 3 dimensions, is the bottom direction corresponds to sheets.

Finally, the bottom-right corner of the display has a widget for assigning directions to the 4 display sides. As the 4 visible directions can be switched with the mouse, this is only relevant for dimensions 5 or higher, which should be very rare. All directions have a section value irrespective of the side they occupy, so that switching does not require input.

2.9 the QEW Internal Storage

Saving and retrieving objects is a common problem in object-oriented programming Numerous frameworks exits that link volatile memory to various kinds of storage, such as RDBMS, object databases, XML etc. When implementing a BDW, there are many choices. A versatile solution is more powerful, but it also more difficult to program.

For a stand-alone BDW, the choice is dictated by the target audience. If the intention is to compete against current spreadsheet solutions, people familiar with complex spreadsheets in enterprise environments should have an easy time adapting. To provide ways for them to do what they do now in a robust, multi-user way, while not changing their process much, most tasks should be graphical, programming rare, and knowing object-oriented programming and SQL not necessary.

The following limited set of types accomplishes these goals:
  basic types: Integer, float, date, string etc.
  Data: Consists of a set of attributes, each characterized by a name, type and default value. Attributes can be grouped in blocks, and ordered within a block.
  Array: A ordered set of objects of the same type, with one block with label None. Can be extended or trimmed.
  Set: An unordered set of objects of the same Data. Blocks are associated with sorting criteria, defined in terms of attributes. Provides insert and delete operations.

It is suitable for most cases that spreadsheets are used for, namely data with some structure, but not requiring associating methods with data types. The learning curve is not steep. Only Data types must be configured, which is similar to choosing column headings.

The implementation relies on existing solutions, using an RDBMS as a back-end. Type is a close equivalent to SQL tables, which can be managed with graphical database design tools, of which many exist, including open source. Modifying Data types translates into executing SQL that changes tables without loosing data.

For the same reason spreadsheets use add-ins, this set of types has limitations. However, if more than the above is needed, the application probably needs a specialized solution built on a strong platform.

3. The CVD Format

CVD separates the three components of data, calculations and visualization. This allows multiple calculations to use the same data, while each having multiple visualizations. This section covers the representation of calculations and visualizations; data is assumed to be available via the BlockData interface, which constitutes the data part of the format.

3.1 Calculations

Figure 9:
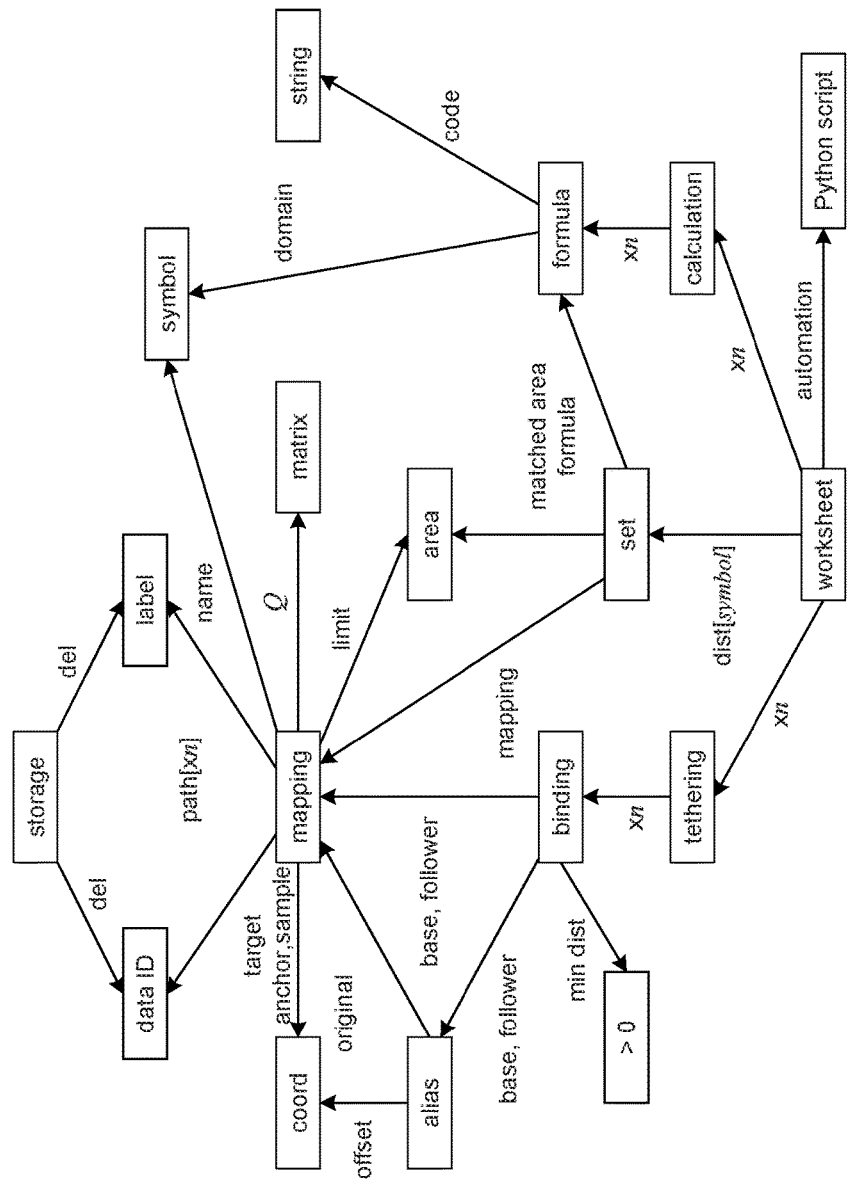
FIG. 9 illustrates a calculation portion of the calculation/visualization/data format.

The calculation portion of the CVD format is shown in FIG. 9. The top object is the worksheet, with the following components:

1. A dictionary of sets, indexed by symbols that are used by mappings, calculations and the Python script. The default symbols are a, b, c, . . . . Each set has an area, and optionally a mapping and a formula with matching symbol.
2. A set of calculations. Each is a set of formulas.
3. A set of tetherings, each in turn a set of bindings (see 2.6).
4. A Python script. Automates area construction and executing calculations. For example, the steps for a self-adjusting Fibonacci are:
   (a) Extract b.
   (b) Set d=b−c.
   (c) Execute the calculation.

An important part of the calculation format is the formula syntax. The goals are power, a readable format, easy editing and efficient execution. The starting point is the following EBNF regular grammar, which captures index and label calculations, and allows snippets of native code:

FIG. 9: The calculation portion of the CVD format. Target IDs and labels (yellow) can be deleted in the storage. Calculation basic types are in blue, and compound types in gray. Sets are stored as a dictionary with symbols as keys. The name of the mapping of a set, and the domain of the formula must match its key (they are all symbols).

Code snippets cover language-specific arithmetic expressions, importantly including operators. Consider the formula a[N]=b[N]−c[N], where b and c refer to instances of a class Data that implements a subtraction operation. For the − operator to execute correctly, it must be a code snippet.

Simple yet important additions are shortcuts for attribute and vector notations: x.a is equivalent to x.a[( )] for the 0-dimensional tuple, and a[N] to a.None[N]. Operations like the Sum of 2.4.1 are also needed. It is not obvious the Python syntax is the best choice. In 2.4.1, it was disclosed that b[N]=Sum(a, lambda R,C: a[N,C]), but b[N]=Sum(a[N,C] over c[R,C]) is easier to read.

While the syntax presented here is usable, it is still work in progress. Designing abstract languages and building custom editors is well understood, thus the obstacle is not how to do it, but rather knowing what should be put in. More experience is needed.

3.2 Visualization

The representation of visualizations is simple, and corresponds to the discussion in 2.7. Any view is applicable to any calculation, with the separation achieved by symbols. From this stored information and a calculation, a screen view can be constructed. The top object is the view, composed of:

1. A set of groups. Each group consists of a set of symbols.
2. A set of grids. A grid has a dimension, mode, a collapsed/visible flag (bool), section and preferred axes (see 2.8), and axis point names. The last store strings for coordinate values, so that e.g. C=1 can be displayed as 'A' or Z=1 as Sheet1.
3. Active grid, per group and grid selection (coord), scroll position (two numbers between 0 and 1), and stacking order (sequence of symbols).

The three can be further divided to allow certain aspects to be shared, while other are individual. Having multiple versions of 3) for pairs of 1) and 2) allows individual users to have their own selection, scrolls and stack orders.

3.3 Multi-User Issues

In a multi-user environment, data, calculations and visualizations can change independently. Calculations and visualizations must therefore be adjusted:

1. Updating a calculation after changes in data. There are two cases:
   (a) A target no longer exists.
   (b) A label no longer exists; count a change of dimension as deletion.

Both result in deleting the mapping. The effect will propagate as follows:
   (a) Aliases of the mapping will be deleted.
   (b) Bindings involving deleted mappings or aliases will be deleted.
   (c) The mapping of the set containing a deleted mapping will be set to None.
   (d) The limit of the mapping, anchor, sample and matrix Q will be destroyed.

The symbol of the deleted mapping remains, as it is a characteristic of the set. It is possible a formula refers to a set with no mapping, in which case a "coord out of bounds" error occurs.

2. Updating a visualization for changes in its underlying calculation. As a visualization applies to any calculation, the only action needed is to delete a view if its calculation no longer exists.

Changes by a user to calculation or view attributes affect all other users.

4. Conclusions

With its blend of spreadsheet features and structured data, BDWs are aimed at people who have felt the limitations of spreadsheets. This could mean complexity, need for multi-user features, or managing imports and exports for dedicated applications. The assumption is a potential BDW user has a sense for the problems BDWs address.

A stand-alone BDW aims to take market share from desktop and shared spreadsheets. Currently there exits a trade-off, as shared ones do not handle the same complexity. BDWs improve on both counts. Regarding complexity, key features are better organization of data, a more natural execution mechanism, and automation. Many spreadsheet concepts, such as charts and pivot tables fit BDW naturally, making extensions feasible. As to sharing, calculations and visualizations can be worked on independently; storing data separately adds flexibility.

An important factor is the learning curve. Broadly, the steps are:

1. Reproduce a spreadsheet by pre-allocating and mapping a 3-dimensional array. The main difference is working with areas, the formula editor and domains.
2. Creating Data types and mappings. Should be a natural extension to choosing column headings for ranges.
3. Learning the automation tools. This includes tethering, creating areas with Python expressions, and automation scripts.

While effort is required, it consists of understanding the problem of combining attributes with tabular layouts, rather than idiosyncratic conventions.

The case is even better when linked with an external system. The competition are export/import tools, and spreadsheet features built within systems. As the BlockData interface is fairly light, a case can be made that even absent formula execution capabilities, BDW's are a compelling solution for managing tabular layouts for object-oriented data. Rather than using a download wizard, a BDW can perform both imports and exports; calculations can be added as needed.

Some example features are:
  Mapping: The Area, BlockData and Mappings interfaces have little idiosyncratic content. Adopting them would create a market for both internal storage systems and BDW applications, including wizard-like tools for managing downloads. Mappings become portable.
  Calculation: While the calculation representations is conceptual, some formula syntax and calculation issues need to be ironed out; more experimentation is needed.
  Visualization: Can be developed independently of calculations, as visualization are defined in terms of symbols. Stacking orders, the lattice mode and groups are a good start, and a robust result is not far.

Figure 10:
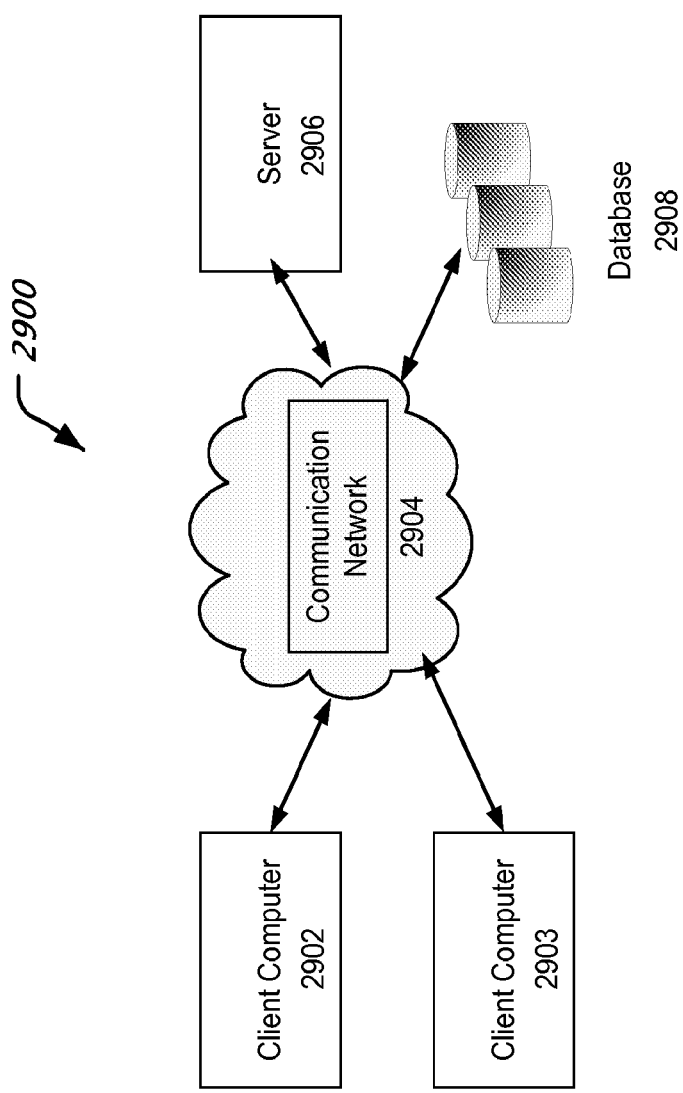
FIG. 10 is a block diagram representation of a data management system.

FIG. 10 depicts an example system 2900 comprising client computers 2902, 2903 communicatively coupled over a communication network 2904 with a server 2906 and a database 2908. The various techniques described in this document can be implemented at the client computer 2902, the server 2906 or partly between the client computer 2902 and the server 2906.

The communication network 2904 can be a suitable network, such as a wired or wireless network, e.g., the Internet, Ethernet, wireless cellular network such as 3G, Long Term Evolution (LTE) network, WiMax, etc. In various embodiments, the client computer 2902 may be a computer, a smartphone, a tablet device, using a suitable operating system. The server 2906 may include a processor, instruction memory and a suitable operating system. The database 2908 may be implemented using storage such as hard drive, flash memory, etc. In various embodiments, the server 2906 and the database 2908 may be implemented on the same hardware platform (e.g., sharing the same power source) or may comprises two different platforms connected over a local connection such as an SCSI interface.

Figure 11:
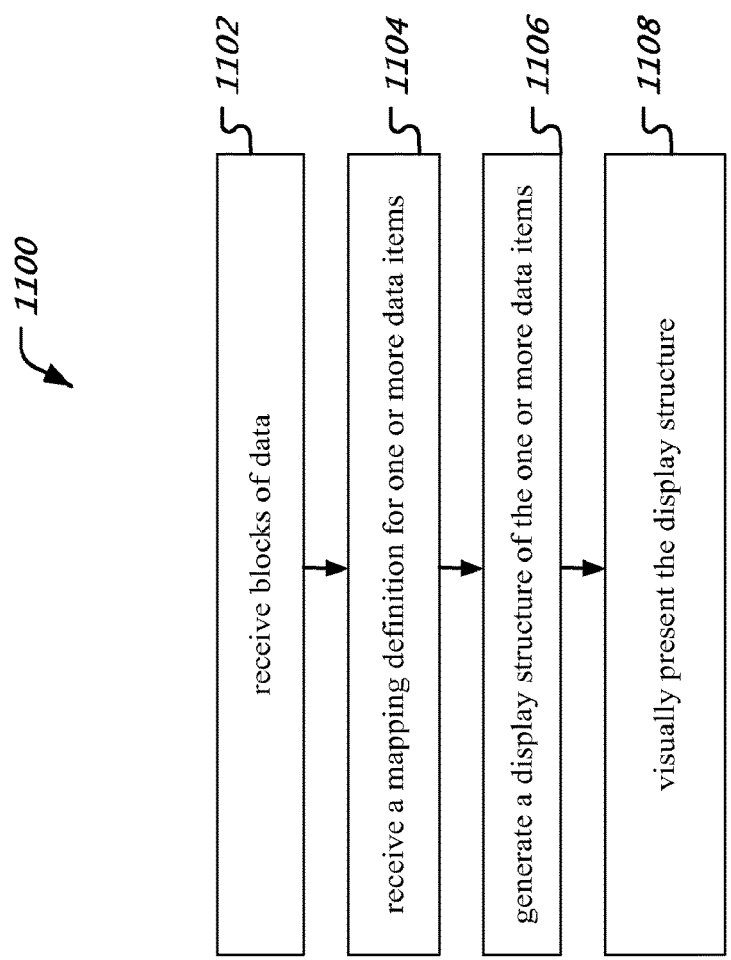
FIG. 11 is a flowchart representation of a method of presenting information to a user.

FIG. 11 is a flowchart representation of a process 1100 of presenting information to a user. The process 1100 may be implemented at the client device 2902 or at the server 2906, with presentation data, or view data, being transferred to the client device 2902 over the communications network 2904.

At 1102, blocks of data are received over a block data interface (BDI). Each block of data includes one or more data items indexed using one or more dimensions. Each block of data shares a display attribute. In some implementations, the block data interface may be an interface that is internal to a software platform, so that the block data interface can be implemented as an application programmer interface (API) between two software modules. In some implementations, the BDI may be implemented as hypertext data transferred between a server and a client across a computer network using a pre-defined BDI data format.

At 1104, a mapping definition is received for the one or more data items. In some implementations, the mapping definition is received along with the BDI data. In some implementations, the mapping definition is received from user-editable formulas. The mapping definition may be received over a formula API which specifies a format in which users can specify linear mappings between data items.

At 1106, a display structure is generated for the one or more data items based on the mapping. The present document discloses various display structures that can be constructed using the data and mapping. As previously discussed, the mapping may result in the one or more data items overlapping in a dimension. For displaying such overlapping data items, a display structure may be generated to have a lattice form. The lattice form includes a first portion indicative of the availability of multiple 2-dimensional views of the one or more data items available to a user. For example various color schemes can be used to indicate the availability of different lattice views of data on a 2-dimensional spreadsheet-like view. The display structure also includes a second portion from which a user can select one of the multiple 2-dimension views to become the active view that is viewable by the user. In some implementations, the second portion is provided in the form of a control area that provides control widgets such as the buttons "a", "b", etc. depicted, e.g., in FIGS. 2 to 5. Other possibilities include a drop down list, radio buttons, and so on.

In some implementations, the display structure may further include a third portion for displaying formula that indicates the mapping definition of the 2-dimensional view that is the active view. As depicted in FIGS. 2 to 5, the formula may be displayed in a fixed or editable window in top left corner if display (or generally in any other suitable location). As can be appreciated, when a user is viewing an active view, the "pressed" and "unpressed" indication on the control buttons and the color scheme also indicates the presence of non-active views for the data to the user.

At 1108, the display structure is visually presented to a user. In some implementations, when the mapping results in the one or more data items overlapping in a dimension, then the display structure is generated to have a lattice form comprising a first portion indicative of availability of multiple 2-dimensional views of the one or more data items available to the user and a second portion for the user to select one of the multiple 2-dimensional views to become an active view that is viewable by the user.

Figure 12:
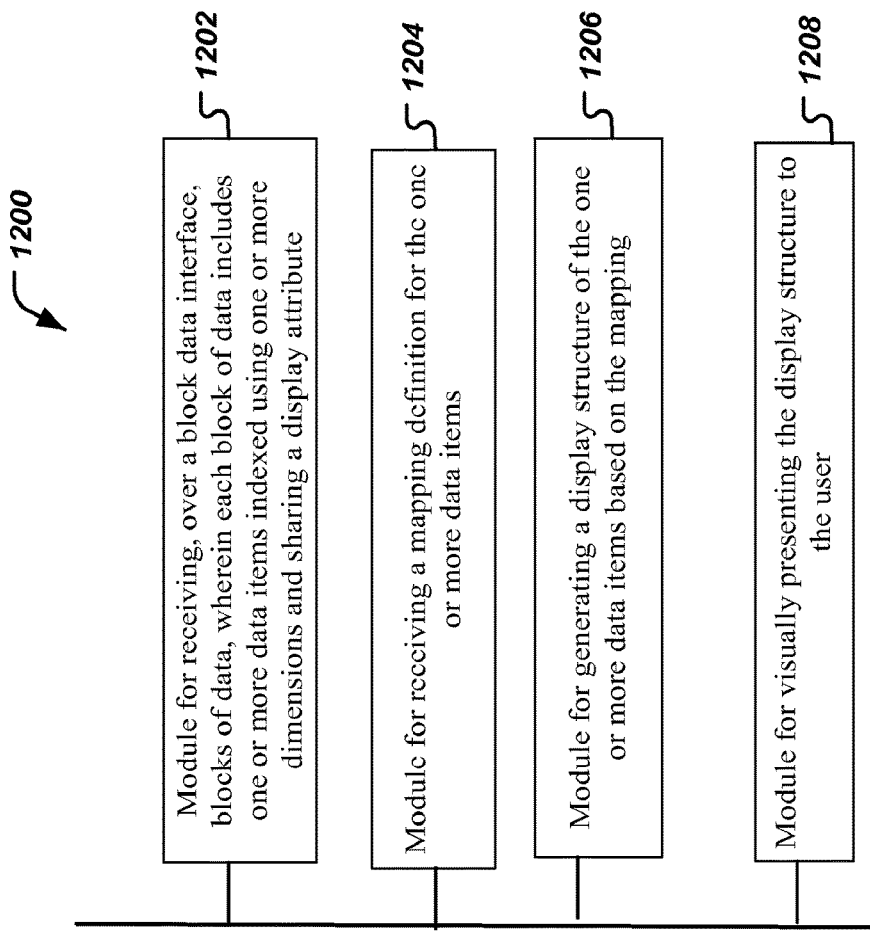
FIG. 12 is a block diagram representation of an apparatus for presenting information to a user.

FIG. 12 is a block diagram representation of an apparatus 1200 for presenting information to a user. The module 1202 is for receiving, over a block data interface, blocks of data, wherein each block of data includes one or more data items indexed using one or more dimensions and sharing a display attribute. The module 1204 is for receiving a mapping definition for the one or more data items. The module 1206 is for generating a display structure of the one or more data items based on the mapping. The module 1208 is for visually presenting the display structure to the user. The apparatus 1200 and modules 1202, 1204, 1206, 1208 may be further configured to implement some of the techniques disclosed in the present document.

Figure 13:
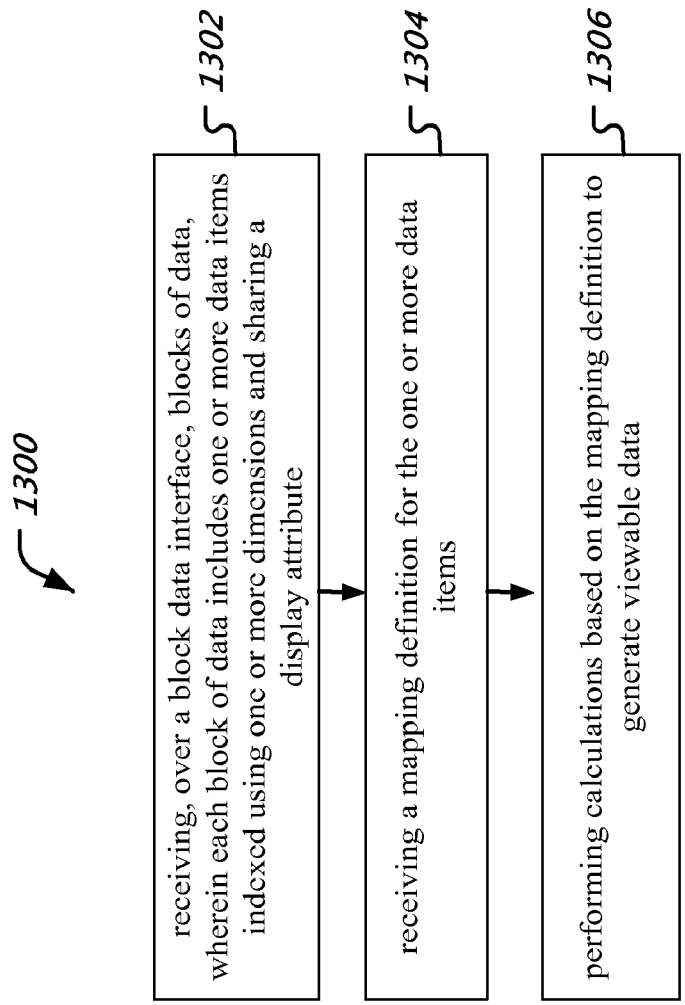
FIG. 13 is a flowchart representation of a method of processing information for user manipulation.

FIG. 13 is a flowchart representation of a method 1300 of providing information for user manipulation. The method 1300 may be implemented on the client device 2902.

At 1302, blocks of data are received over a block data interface. Each block of data includes one or more data items indexed using one or more dimensions and sharing a display attribute. For additional detail, please refer to 1202 described above.

At 1304, a mapping definition is received for the one or more data items. In some implementations, the receiving the mapping definition comprises receiving the mapping definition as a formula, wherein the formula provides a relationship between a finite portion of the viewable data.

At 1306, the method 1300 performs calculations based on the mapping definition to generate viewable data. These calculations may be performed to generates results desired by the user. For many time critical systems, the amount of calculations performed may be significant. For example, in scenarios such as stock market applications, or e-commerce websites that make available thousands of items for purchases by thousands of users, which result in millions of transactions on a daily basis, the number of mapping calculations that the method 1300 (or the previously described method 1200) perform may be of the order of 100 million add/subtract/multiply calculations per day. Also, data items may often be received in thousands of items per second (e.g., stock trading values) and the method 100 may have to update viewable data at the rate of thousands of entries every second—which makes this activity prohibitively complex for any human implementation.

Figure 14:
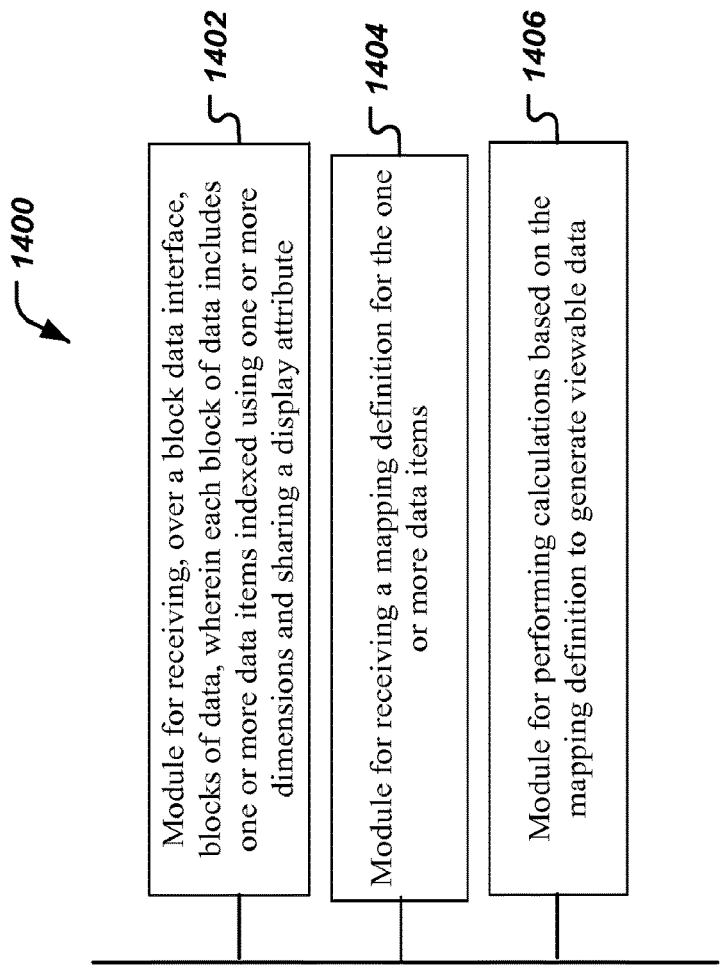
FIG. 14 is a block diagram representation of an apparatus for providing information for user manipulation.

FIG. 14 is a block diagram representation of an apparatus 1400 for providing information for user manipulation. The module 1402 is for receiving, over a block data interface, blocks of data, wherein each block of data includes one or more data items indexed using one or more dimensions and sharing a display attribute. The module 1404 is for receiving a mapping definition for the one or more data items. The module 1408 is for performing calculations based on the mapping definition to generate viewable data. The apparatus 1400 and modules 1402, 1404, 1406 may be further configured to implement some of the techniques disclosed in the present document.

One of skill in the art will appreciate that techniques are provided for generating user viewable data in a compact format, called block data interface. The disclosed techniques enable processing and viewing of information by providing data views to user such that the data may have overlapping ranges. Furthermore, linear mappings of data can be specified by the user using a formula editing technique.

One of skill in the art will also appreciate that the disclosed techniques can be implemented to interface with multiple external systems, and use data items from an external storage. For example, multiple stock brokerages may be able to use stock market data from the same database using their own independent implementations of block data worksheets by received the data items on a block data interface and specifying their own data relationships (mappings). This is in contrast to presently available spreadsheet programs that do not make internal data externally available to multiple different users or systems, for these multiple users to independently manipulate the data.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is what is described and illustrated, including:

1. A method for presenting information on a user interface, the user interface comprising a grid with coordinates, the method comprising:
   receiving, over a block data interface, blocks of data, wherein each block of data includes one or more data items indexed using one or more dimensions and comprising a set of attributes;
   receiving a user input from the user interface, wherein the user input specifies an attribute from the set of attributes and a location on the user interface;
   generating a mapping definition for the one or more data items, wherein the mapping definition comprises a linearized path and an anchor, and wherein the generating the mapping definition comprises:
      determining the linearized path by selecting a subset of data items from the one or more data items based on the specified attribute; and
      determining the anchor, wherein the anchor comprises a set of coordinates on the grid that correspond to the specified location on the user interface;
   generating a display structure of the one or more data items based on the linearized path; and
   visually presenting the display structure at the set of coordinates indicated by the anchor to the user interface.

2. The method of claim 1, wherein, when the mapping definition results in the one or more data items overlapping in a dimension, then:
   generating the display structure to have a lattice form comprising a first portion indicative of availability of multiple 2-dimensional views of the one or more data items available to the user interface and a second portion for the user interface to select one of the multiple 2-dimensional views to become an active view that is viewable on the user interface.

3. The method of claim 2, wherein the display structure further comprises:
   a third portion for displaying a formula indicative of the mapping definition of the 2-dimensional view that is the active view.

4. The method of claim 1, wherein the generating the mapping definition further comprises determining a matrix of mapping factors based on the subset of data items from the one or more data items and the specified attribute, and wherein generating the display structure is further based on the matrix of mapping factors.

5. An apparatus, comprising a processor, for presenting information on a user interface, the user interface comprising a grid with coordinates, the apparatus comprising:
   a block data receiver module that receives, over a block data interface, blocks of data, wherein each block of data includes one or more data items indexed using one or more dimensions and comprising a set of attributes;
   a user input receiver module that receives a user input from the user interface, wherein the user input specifies an attribute from the set of attributes and a location on the user interface;
   a mapping module that generates a mapping definition for the one or more data items, wherein the mapping definition comprises a linearized path and an anchor, and wherein generating the mapping definition comprises:
      determining the linearized path by selecting a subset of data items from the one or more data items based on the specified attribute; and
      determining the anchor, wherein the anchor comprises a set of coordinates on the grid that correspond to the specified location on the user interface;
   a display structure generator module that generates a display structure of the one or more data items based on the linearized path; and
   a presentation module that visually presents the display structure at the set of coordinates indicated by the anchor to the user interface.

6. The apparatus of claim 5, further comprising:
   a lattice display generation module that generates, when the mapping definition results in the one or more data items overlapping in a dimension, the display structure to have a lattice form comprising a first portion indicative of availability of multiple 2-dimensional views of the one or more data items available to the user interface and a second portion for the user interface to select one of the multiple 2-dimensional views to become an active view that is viewable on the user interface.

7. The apparatus of claim 6, wherein the display structure further comprises:
   a third portion for displaying a formula indicative of the mapping definition of the 2-dimensional view that is the active view.

8. The apparatus of claim 5, wherein the generating the mapping definition further comprises determining a matrix of mapping factors based on the subset of data items from the one or more data items and the specified attribute, and wherein generating the display structure is further based on the matrix of mapping factors.

9. A computer program product comprising a non-transitory computer-readable storage medium having code stored thereon, the code, when executed, causing a processor to implement a method for presenting information to a user interface, the user interface comprising a grid with coordinates, the method comprising:
   receiving, over a block data interface, blocks of data, wherein each block of data includes one or more data items indexed using one or more dimensions and comprising a set of attributes;
   receiving a user input from the user interface, wherein the user input specifies an attribute from the set of attributes and a location on the user interface;
   generating a mapping definition for the one or more data items, wherein the mapping definition comprises a linearized path and an anchor, and wherein the generating the mapping definition comprises:
      determining the linearized path by selecting a subset of data items from the one or more data items based on the specified attribute; and determining the anchor, wherein the anchor comprises a set of coordinates on the grid that correspond to the specified location on the user interface;

generating a display structure of the one or more data items based on the linearized path; and visually presenting the display structure at the set of coordinates indicated by the anchor to the user interface.

10. The computer program product of claim 9, wherein, the method further comprises:

when the mapping definition results in the one or more data items overlapping in a dimension, then generating the display structure to have a lattice form comprising a first portion indicative of availability of multiple 2-dimensional views of the one or more data items available to the user interface and a second portion for the user interface to select one of the multiple 2-dimensional views to become an active view that is viewable on the user interface.

11. The computer program product of claim 10, wherein the display structure further comprises:

a third portion for displaying a formula indicative of the mapping definition of the 2-dimensional view that is the active view.

12. The computer program product of claim 9, wherein the generating the mapping definition further comprises determining a matrix of mapping factors based on the subset of data items from the one or more data items and the specified attribute, and wherein generating the display structure is further based on the matrix of mapping factors.

* * * * *